United States Patent
Son et al.

(10) Patent No.: US 10,972,185 B2
(45) Date of Patent: Apr. 6, 2021

(54) ACTIVE OPTICAL CABLE

(71) Applicant: OPTOMIND INC., Suwon-si (KR)

(72) Inventors: Yung Sung Son, Suwon (KR); Taeyong Kim, Suwon (KR); Yong Sung Jin, Seoul (KR)

(73) Assignee: Optomind, Inc.

( * ) Notice: Subject to any disclaimer, the term of this patent is extended or adjusted under 35 U.S.C. 154(b) by 0 days.

(21) Appl. No.: 16/429,351

(22) Filed: Jun. 3, 2019

(65) Prior Publication Data

US 2020/0204259 A1    Jun. 25, 2020

(30) Foreign Application Priority Data

Dec. 21, 2018  (KR) .................. 10-2018-0166839
May 31, 2019   (KR) .................. 10-2019-0064267

(51) Int. Cl.
| H04B 10/40 | (2013.01) |
| H04B 10/25 | (2013.01) |
| G02B 6/42  | (2006.01) |
| H04B 10/66 | (2013.01) |
| H04B 10/50 | (2013.01) |

(52) U.S. Cl.
CPC ..... *H04B 10/25891* (2020.05); *G02B 6/4214* (2013.01); *H04B 10/40* (2013.01); *H04B 10/502* (2013.01); *H04B 10/66* (2013.01)

(58) Field of Classification Search
CPC .................. H04B 10/40; H04B 10/50–588
See application file for complete search history.

(56) References Cited

U.S. PATENT DOCUMENTS

| 10,268,007 | B2  | 4/2019  | Son et al.                    |
| 2004/0013431 | A1* | 1/2004  | Vail .............. H01S 5/4031 |
|            |     |         | 398/84                        |
| 2005/0078916 | A1* | 4/2005  | Hosking ............ H04B 10/40 |
|            |     |         | 385/88                        |
| 2012/0263202 | A1  | 10/2012 | Steinle et al.                |
| 2015/0071651 | A1* | 3/2015  | Asmanis ............. H04B 10/54 |
|            |     |         | 398/141                       |
| 2018/0306985 | A1  | 10/2018 | Son et al.                    |

FOREIGN PATENT DOCUMENTS

| JP | 2001-133708 A | 5/2001  |
| JP | 2007-028539 A | 2/2007  |
| JP | 2018-182381 A | 11/2018 |
| KR | 100725994 B1  | 6/2007  |

OTHER PUBLICATIONS

Office Action regarding Korean Patent Application No. 10-2019-0064267 (with English tranlsation), dated Aug. 11, 2020 (14 pages).

* cited by examiner

*Primary Examiner* — Nathan M Cors
(74) *Attorney, Agent, or Firm* — Harness, Dickey & Pierce, P.L.C.

(57) ABSTRACT

An active optical cable (AOC) is disclosed. According to the present disclosure, an AOC, when connected to a network equipment, generates, changes or deletes and then transmits new information necessary for the a network equipment to recognize and operate the AOC itself, and thereby enabling a data center provided with the AOC and the network equipment to perform data communication smoothly without failure.

15 Claims, 6 Drawing Sheets

ACTIVE OPTICAL CABLE

CROSS-REFERENCE TO RELATED APPLICATIONS

The present application is based on, and claims priority from Korean Patent Application No. 10-2019-0064267 filed on May 31, 2019, and Korean Patent Application No. 10-2018-0166839 filed on Dec. 21, 2018, the disclosures of which are incorporated by reference herein in their entireties.

TECHNICAL FIELD

The present disclosure in some embodiments relates to an active optical cable (AOC).

BACKGROUND

The statements in this section merely provide background information related to the present disclosure and do not necessarily constitute prior art.

Cisco Visual Networking Index 2018 has presumed that 2022 will see internet data usage per month per person reached 85 GB, and the number of network connection devices per person increased more than 3.6 times according to the development of Internet of Things (IoT), 5G mobile communication network technology, etc. It also expected that video contents that occupied 70% of total data traffic in 2017 will increase to more than 80% in 2022.

When classified by destination, explosively increasing data traffic may go to the inside of data centers, between data centers, and between the data center and the user. 70% or more of the global data traffic is generated in the data center. This indicates that data generated worldwide are mostly based on activities such as production, processing, storage, authentication of data generated within the data center.

Optical interconnect solutions are most realistic to tackle such current explosive increase in data traffic inside the data center.

The optical interconnect solutions have already replaced copper based interconnect networks in long-haul and metropolitan communication networks. The optical interconnect solutions have broadened their territory thanks to increasing bandwidth and the advancement of optical communication technology. Of such optical interconnect solutions, an optical transceiver is representative of long-haul optical interconnect solutions.

From a viewpoint of the user, an optical transceiver has both electrical and optical interfaces. Interconnecting two physically separate points using the optical transceiver needs two optical transceivers and a patch cord for the generation of optical interconnect between these two optical transceivers. Both of the optical transceivers need to be designed and manufactured to meet with the characteristics of optical signals received and transmitted ('transceived') by the optical transceivers, respectively. In particular, selecting a patch cord for interconnecting two optical transceivers needs a careful consideration of the performance of those optical transceivers, their standard interfaces, etc. For example, when one optical transceiver at one side utilizes a light source for multi-mode optical fiber, the other optical transceiver at the other side is supposed to utilize the same kind of light source for multi-mode optical fiber with the patch cord being based on the multi-mode optical fiber so that it can interconnect the two optical transceivers. In other words, compared to an active optical cable (AOC) having just an electrical interface, an optical transceiver having both electrical and optical interfaces is more difficult to maintain and manage, and has a poorer freedom of choice.

A small form factor pluggable (SFP) type of AOC shown in FIG. 1A, or a quad small form factor pluggable (QSFP) type of AOC shown in FIG. 1B, each of which has a structure similar to the optical transceiver, includes an electrical interface only. Optical transmission-reception modules at both ends of the SPF AOC or the QSFP AOC need no constant monitoring of the optical output of the light source or other factors as with the conventional optical transceiver, because they go through complete testing and setup of their optical components and electronic components during manufacturing. Therefore, an AOC having such a structure as illustrated can be easily installed, maintained and managed while having substantially the same performance and functions as the optical transceiver.

Therefore, there is a need for an AOC that is as easy to install and use, simple to maintain and manage as a conventional copper cable, and at least as effective as an optical transceiver.

SUMMARY

In accordance with some embodiments, the present disclosure seeks to provide an AOC which, when connected to a network equipment, generates, changes or deletes and then transmits new information necessary for the a network equipment to recognize and operate the AOC itself, and thereby enabling a data center provided with the AOC and the network equipment to perform data communication smoothly without failure.

According to one aspect of some embodiments, an active optical cable includes an optical link, a first transmission-reception module and a second transmission-reception module. The optical link is configured to include a first end and a second end, and to transfer optical signals inputted from an external source out of the first end and the second end bilaterally. The first transmission-reception module is configured to either convert a first electrical signal inputted from an external source to a first optical signal and then transmit the first optical signal over the optical link to an opposite end, or convert a second optical signal received from the opposite end of the optical link to a second electrical signal and then output the second electrical signal externally, to control the first optical signal by using a first information which is at least one or more pieces of pre-stored information on electrical/optical characteristics, temperature characteristics and attribute information, and to generate, change or delete the first information. The second transmission-reception module configured to either convert a third electrical signal inputted from an external source to a third optical signal and then transmit the third optical signal through the second end to the first transmission-reception module, or convert a fourth optical signal received from the first transmission-reception module through the second end to a fourth electrical signal and then output the fourth electrical signal externally, to control the third optical signal by using a second information which is at least one or more pieces of pre-stored information on electrical/optical characteristics, temperature characteristics and attribute information, and to generate, change or delete the second information.

According to this embodiment, as described above, an AOC, when connected to a network equipment, effects to generate, change or delete and then transmit new information necessary for the a network equipment to recognize and operate the AOC itself, and thereby enabling a data center provided with the AOC and the network equipment to perform data communication smoothly without failure.

DETAILED DESCRIPTION

Exemplary embodiments of the present disclosure are described below with reference to the accompanying drawings.

Figure 1A:
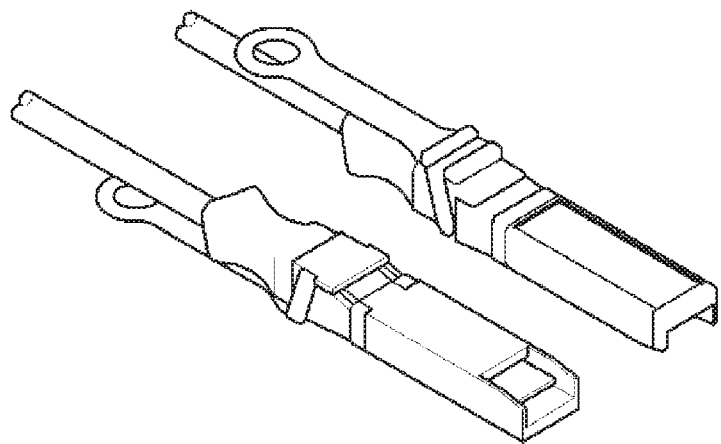
FIGS. 1A and 1B are schematic diagrams of a conventional AOC.
Figure 1B:
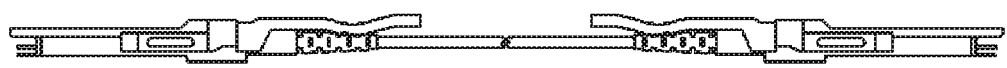
Figure 2A:
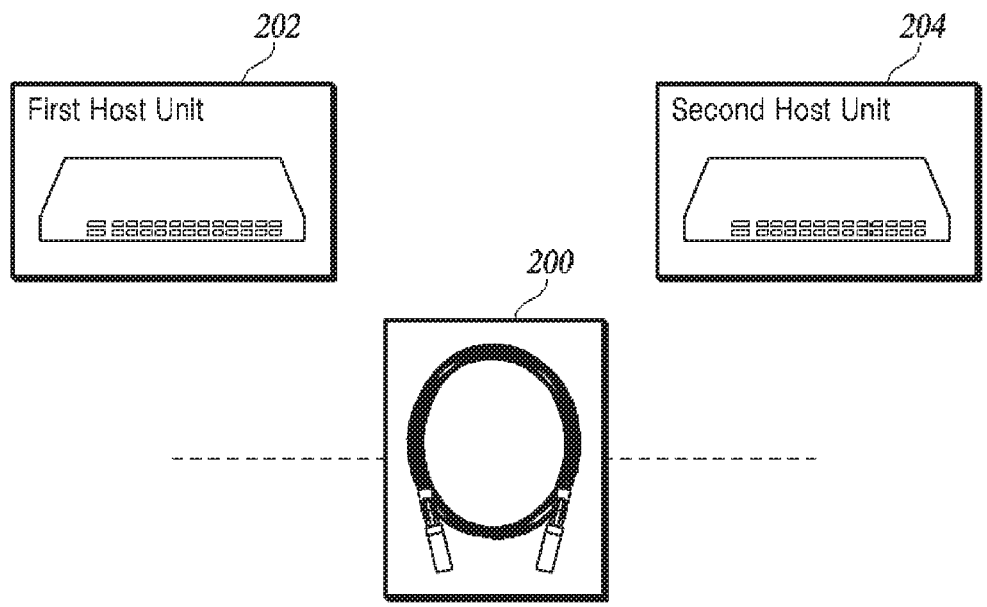
FIGS. 2A and 2B are diagrams of illustrative applications of the AOC according to at least one embodiment of the present disclosure.
Figure 2B:
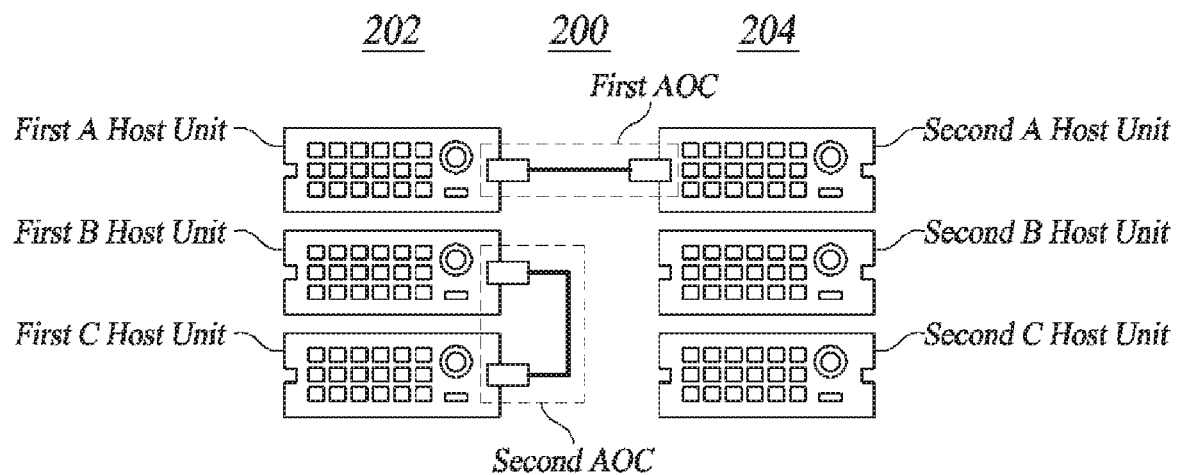

FIGS. 2A and 2B are diagrams of illustrative applications of an AOC according to at least one embodiment of the present disclosure.

An AOC 200 according to at least one embodiment of the present disclosure includes two optical modules and an optical link for interconnecting these two optical modules. However, components included in the AOC 200 are not particularly limited thereto.

Referring to FIG. 2A, the AOC 200 according to at least one embodiment interconnects between first host units 202 and second host units 204 in order to transfer data from the first host units 202 to the second host units 204, as well as from the second host units 204 to the first host units 202. Each of the first host units 202 and the second host units 204 may be one selected from among network devices that serve as a server, switch and storage.

Referring to FIG. 2B, the AOC 200 according to at least one embodiment may be arranged as a first AOC that connects the first host units 202 and the second host units 204, or as a second AOC that interconnects two host units selected from a first A host unit, first B host unit and first C host unit which are included in the first host units 202. Alternatively, the AOC 200 may be arranged to interconnect two selected among a second A host unit, second B host unit and second C host unit which are included in the second host units 204. Further, the AOC 200 may be an optical cable formed to connect from a single host unit to multiple host units. Individual host units included in the first host units 202 and in the second host units 204, that is, each of the first A host unit, first B host unit, first C host unit, second A host unit, second B host unit and second C host unit may be one of network devices that serve as one of a switch, server and storage.

Small form-factor (SFF) multi-source agreement (MSA) defines a memory map of 256 bytes to be written to a non-volatile memory. Here, the non-volatile memory may be an electrically erasable programmable read-only memory (EEPROM).

Recorded in the EEPROM memory map may be information on the performance of the optical transmission-reception module, the standard interface and the manufacturer, etc. It includes an $I^2C$ interface to provide communication with external devices. Such an interface may be configured to support communication with an external device by using a single wire or a plurality of wires. For example, the EEPROM memory map may utilize an 8-bit address 1010000X (A0h).

The latest optical transmission-reception modules support a standard digital diagnostic monitoring (DDM) function. The standard digital diagnostic monitoring function is also called digital optical monitoring (DOM). An optical transmission-reception module user can perform a real-time monitoring of various optical transmission-reception module parameters by using the standard DDM and DOM.

The various optical transmission-reception module parameters of the optical transmission-reception modules may include types of optical transmission-reception modules, connector type, electronic and/or optical compatibility, codes of a high-speed serial encoding algorithm, nominal signaling rate, type of signaling rate selection function, link length, type of supported optical fiber, supplier name, IEEE company ID, serial number of the product from the supplier, the supplier's production date code, the supplier's provided part number, the supplier's provided revision history of the part number, laser wavelength, optical output power, optical input power, temperature, laser bias current and module supply voltage.

For example, the DDM information makes the 8-bit address 1010001X (A2h) available so that the information may be used without changing the contents of the 8-bit address 1010000X (A0h) using the EEPROM information. The higher-order 128 bytes of the A2h memory area are provided for future use.

Standard digital diagnostic monitoring (DDM) and digital optical monitoring (DOM) functions are typically implemented for monitoring at routers, switches, and optical transport equipment by using the simple network management protocol (SNMP).

The DDM and DOM functions may display the diagnostic data, alarm or warning for the optical transmission-reception module by using the DDM interface. In general, an optical transmission-reception module supplier can set an alarm threshold value for various information. For example, an optical transmission-reception module supplier may set high alarms, low alarms, thresholds that trigger the high alarms or low alarms before shipment and enter them into an optical transmission-reception module.

Additionally, information may be inputted in the DDM memory area, including information on thresholds of laser temperature and thermo-electric cooler (TEC) current alarm and warning, diagnostic calibration constant information, clock data recovery (CDR) state information, and the reception determination threshold value information. Most latest optical transmission-reception module devices support DDM and/or DOM interfaces.

Figure 3:
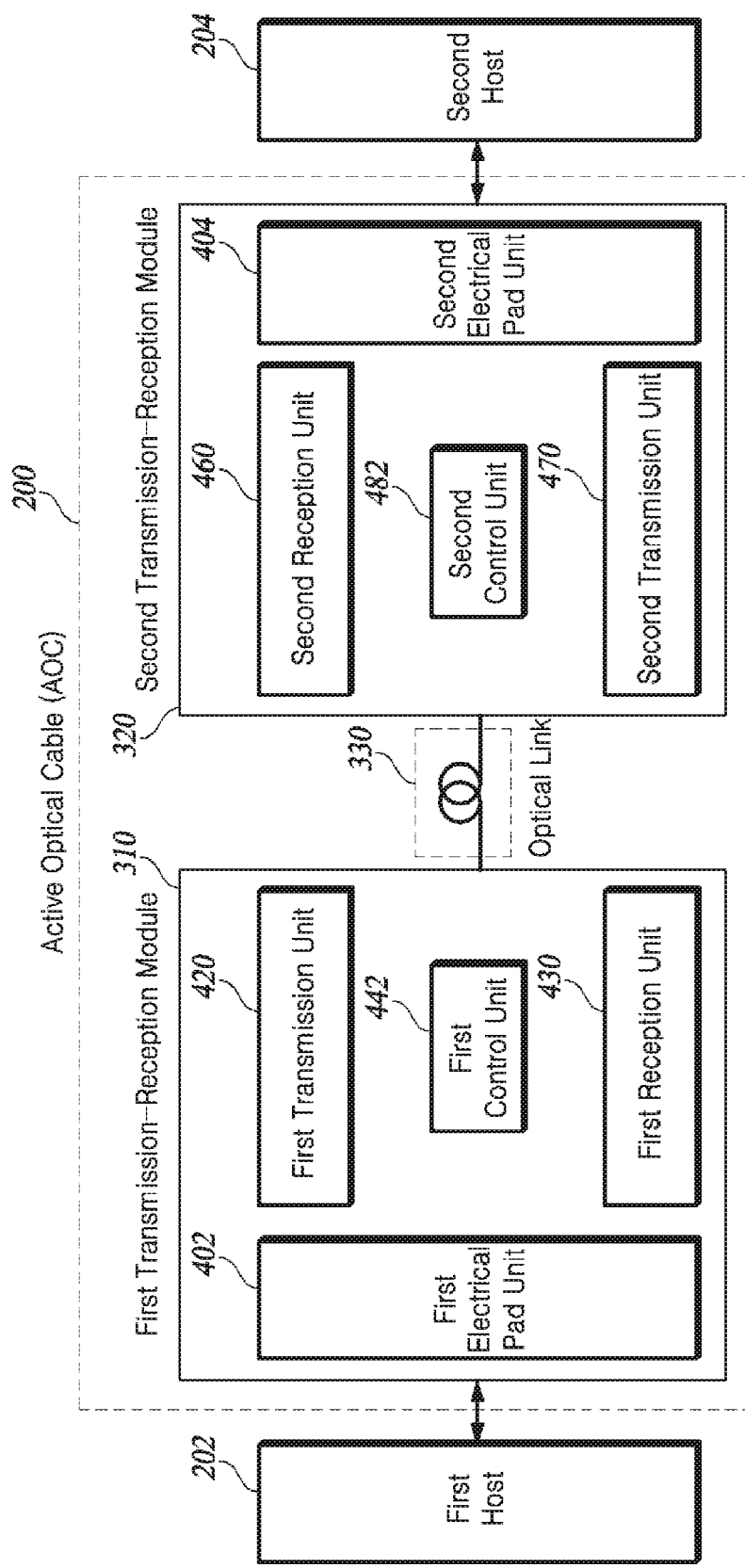
FIG. 3 is a schematic block diagram of an internal module of the AOC according to a first embodiment.

FIG. 3 is a schematic block diagram of an internal module of the AOC according to a first embodiment.

The AOC 200 according to the first embodiment includes a first transmission-reception module 310, a second transmission-reception module 320 and an optical link 330.

The optical link 330 includes a first end and a second end. The optical link 330 bi-directionally transmits the optical signals inputted from the outside of the first end and the second end.

The first transmission-reception module 310 includes a first electrical pad 402, a first transmission unit 420, a first control unit 442 and a first reception unit 430. The first transmission-reception module 310 converts a first electrical signal inputted from the first host units 202 into a first optical signal, and transmits the first optical signal through the first end of the optical link 330 to the opposite second end of the optical link 330. The first transmission-reception module 310 converts a second optical signal received through at least one optical link 330 from the second end of the optical link 330 into a second electrical signal, and outputs the second electrical signal to the first host units 202. The first transmission-reception module 310 controls the first optical signal by using previously stored first information (at least one or more of electrical/optical characteristics, temperature characteristics, and attribute information).

The second transmission-reception module 320 includes a second electrical pad 404, a second transmission unit 470, a second control unit 482, and a second reception unit 460. The second transmission-reception module 320 converts a third electrical signal inputted from the second host units 204 into a third optical signal, and transmits the third optical signal through the second end of the optical link 330 to the first transmission-reception module 310. The second transmission-reception module 320 converts a fourth optical signal received through the second end of the optical link 330 into a fourth electrical signal, and outputs the fourth electrical signal to the second host units 204. The second transmission-reception module 320 controls the third optical signal by using the previously stored second information (at least one or more of electrical/optical characteristics, temperature characteristics, and attribute information).

Figure 4:
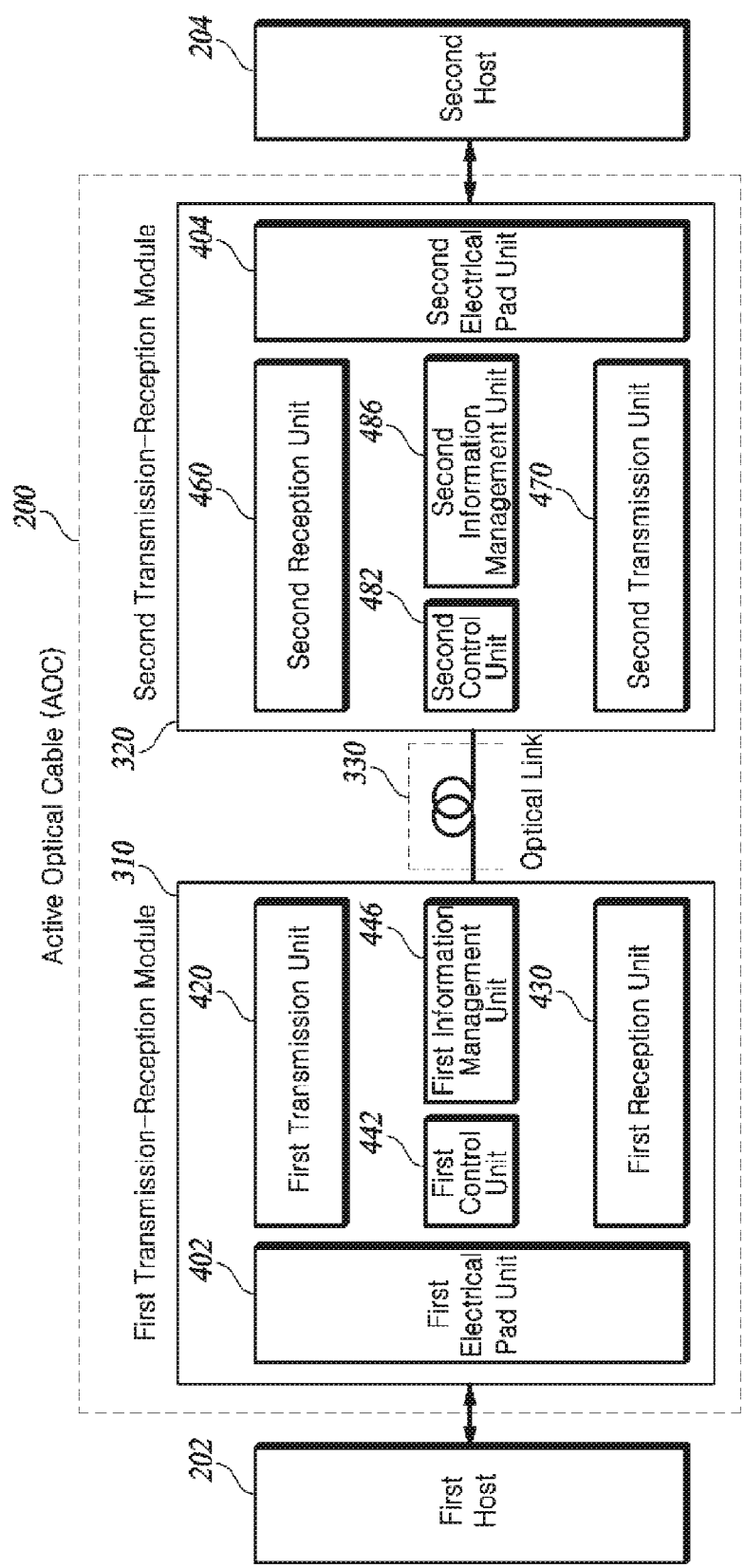
FIG. 4 is a schematic block diagram of an internal module of the AOC according to a second embodiment.

FIG. 4 is a schematic block diagram of an internal module of the AOC according to a second embodiment.

The AOC 200 according to the second embodiment includes the first transmission-reception module 310, the second transmission-reception module 320 and the optical link 330.

The first transmission-reception module 310 includes the first electrical pad 402, first transmission unit 420, first control unit 442, a first information management unit 446 and the first reception unit 430. The first transmission-reception module 310 converts a first electrical signal inputted from the first host units 202 into a first optical signal, and transmits the first optical signal through the first end of the optical link 330 to the opposite second end of the optical link 330. The first transmission-reception module 310 converts a second optical signal received through at least one optical link 330 from the second end of the optical link 330 into a second electrical signal, and outputs the second electrical signal to the first host units 202. The first transmission-reception module 310 controls the first optical signal by using the previously stored first information (at least one or more of electrical/optical characteristics, temperature characteristics, and attribute information).

The first transmission-reception module 310 performs an initialization operation with the external first host units 202 for a predetermined time before transmitting the first optical signal to the second transmission-reception module 320. The first transmission-reception module 310 includes at least one retimer and at least one equalizer.

The first electrical pad unit 402 transmits and receives electrical signals to and from the external first host units 202.

The first transmission unit 420 has at least one first electrical-optical conversion device and a first transmission circuit for driving the first electrical-optical conversion device.

The first control unit 442 controls the operation of the first transmission unit 420 and first reception unit 430. The first control unit 442 controls the first transmission circuit so that the intensity of the optical signal can be kept constant once generated by the at least one first electrical-optical conversion device, even with changing internal and external temperatures of the first transmission-reception module 310.

The first control unit 442 operates according to the result of the initialization operation, for causing the first information management unit 446 to generate fifth information which is an update of third information updated based on prestored module parameter information in the first non-volatile memory.

The module parameter information includes at least one selected from a nominal signaling rate, type of signaling rate selection function, link length, type of supported optical fiber, supplier name, IEEE company ID, serial number of the product from the supplier, the supplier's production date code, the supplier's provided part number, the supplier's provided revision history of the part number, laser wavelength, optical output power, optical input power, temperature, laser bias current and module supply voltage.

The first information management unit 446 includes a first non-volatile memory. The first non-volatile memory may be an electrically erasable programmable read-only memory (EEPROM). The first non-volatile memory stores the first information (at least one or more of electrical/optical characteristics, temperature characteristics, and attribute information).

The first information management unit 446 generates, changes or deletes the first information stored in the first non-volatile memory. The first information management unit 446 generates, changes or deletes at least one of the type of the first transmission-reception module 310 and the type of the first electric pad unit 402 to update the first information (at least one or more of electrical/optical characteristics, temperature characteristics, and attribute information), thereby generating the third information.

The first control unit 442 is formed integrated with the first information management unit 446. The first information management unit 446 is formed integrated with the first non-volatile memory.

The first reception unit 430 has at least one first electrical-optical conversion device for converting the second optical signal to the second electrical signal, and a first transmission circuit for driving the first electrical-optical conversion device.

The at least one first electrical-optical conversion device that is included in the first transmission unit 420, and at least one first optical-electrical conversion device that is included in the first reception unit 430 are optically coupled to the optical link 330 by using a first optical assembly.

The first optical assembly includes, in an integrated structure, a first lens for shaping diverging light emitted from the at least one first electrical-optical conversion device to form a first parallel beam, a first mirror or reflector for altering the travel direction of the first parallel beam by a preset angle to form a second parallel beam, and a second lens for focusing the second parallel beam and causing a focused second parallel beam to be incident on a first end positioned at a preset distance.

The second transmission-reception module 320 includes the second electrical pad 404, second transmission unit 470, second control unit 482, a second information management unit 486 and the second reception unit 460. The second transmission-reception module 320 converts a third electrical signal inputted from the second host units 204 into a third optical signal, and transmits the third optical signal through the first end of the optical link 330 to the opposite second end of the optical link 330. The second transmission-reception module 320 converts a fourth optical signal received through the second end of the optical link 330 from the first transmission-reception module into a fourth electrical signal, and outputs the fourth electrical signal to the second host units 204. The second transmission-reception module 320 controls the third optical signal by using the previously stored second information (at least one or more of electrical/optical characteristics, temperature characteristics, and attribute information).

The second transmission-reception module 320 performs an initialization operation with the external second host units 204 for a predetermined time before transmitting the third optical signal to the first transmission-reception module 310. The second transmission-reception module 320 includes at least one retimer and at least one equalizer.

The second electrical pad unit 404 transmits and receives electrical signals to and from the external second host units 204.

The second transmission unit 470 has at least one second electrical-optical conversion device and a second transmission circuit for driving the second electrical-optical conversion device.

The second control unit 482 controls the operation of the second transmission unit 470 and second reception unit 460. The second control unit 482 controls the second transmission circuit so that the intensity of the optical signal can be kept constant once generated by the at least one second electrical-optical conversion device, even with changing internal and external temperatures of the second transmission-reception module 320.

The second control unit 482 operates according to the result of the initialization operation, for causing the second information management unit 486 to generate sixth information which is an update of fourth information updated based on pre-stored module parameter information in the second non-volatile memory.

The module parameter information includes at least one selected from a nominal signaling rate, type of signaling rate selection function, link length, type of supported optical fiber, supplier name, IEEE company ID, serial number of the product from the supplier, the supplier's production date code, the supplier's provided part number, the supplier's provided revision history of the part number, laser wavelength, optical output power, optical input power, temperature, laser bias current and module supply voltage.

The second information management unit 486 includes a second non-volatile memory. The second non-volatile memory may be an electrically erasable programmable read-only memory (EEPROM). The second non-volatile memory stores the second information.

The second information management unit 486 generates, changes or deletes the second information stored in the second non-volatile memory. The second information management unit 486 generates, changes or deletes at least one of the type of the second transmission-reception module 320 and the type of the second electric pad unit 404 to update the second information, thereby generating the fourth information.

The second control unit 482 is formed integrated with the second information management unit 486. The second information management unit 486 is formed integrated with the second non-volatile memory.

The second reception unit 460 has at least one second optical-electrical conversion device for converting the fourth optical signal to the fourth electrical signal, and a second reception circuit for driving the second optical-electrical conversion device.

The at least one second electrical-optical conversion device that is included in the second transmission unit 470, and at least one second optical-electrical conversion device that is included in the second reception unit 460 are optically coupled to the optical link 330 by using a second optical assembly.

The second optical assembly includes, in an integrated structure, a third lens for shaping diverging light emitted from the at least one second electrical-optical conversion device to form a third parallel beam, a second mirror or reflector for altering the travel direction of the third parallel beam by a preset angle to form a fourth parallel beam, and a fourth lens for focusing the fourth parallel beam and causing a focused fourth parallel beam to be incident on a second end positioned at a preset distance.

The first optical signal, the second optical signal, the third optical signal and the fourth optical signal are optical signals generated on the basis of pulse amplitude modulation or PAM-N technique which uses at least 2 bit logical information value per unit clock pulse. Here, the PAM-N technique includes PAM-4, PAM-8 and PAM-16.

The optical link 330 includes the first and second ends. The optical link 330 transmits the optical signals inputted from the outside of the first and the second ends in both directions.

The optical link 330 includes at least one optical fiber. The at least one optical fiber in the optical link 330 has one end connected to the first transmission unit 420. The at least one optical fiber in the optical link 330 has the other end connected to the second reception unit 460.

Figure 5:
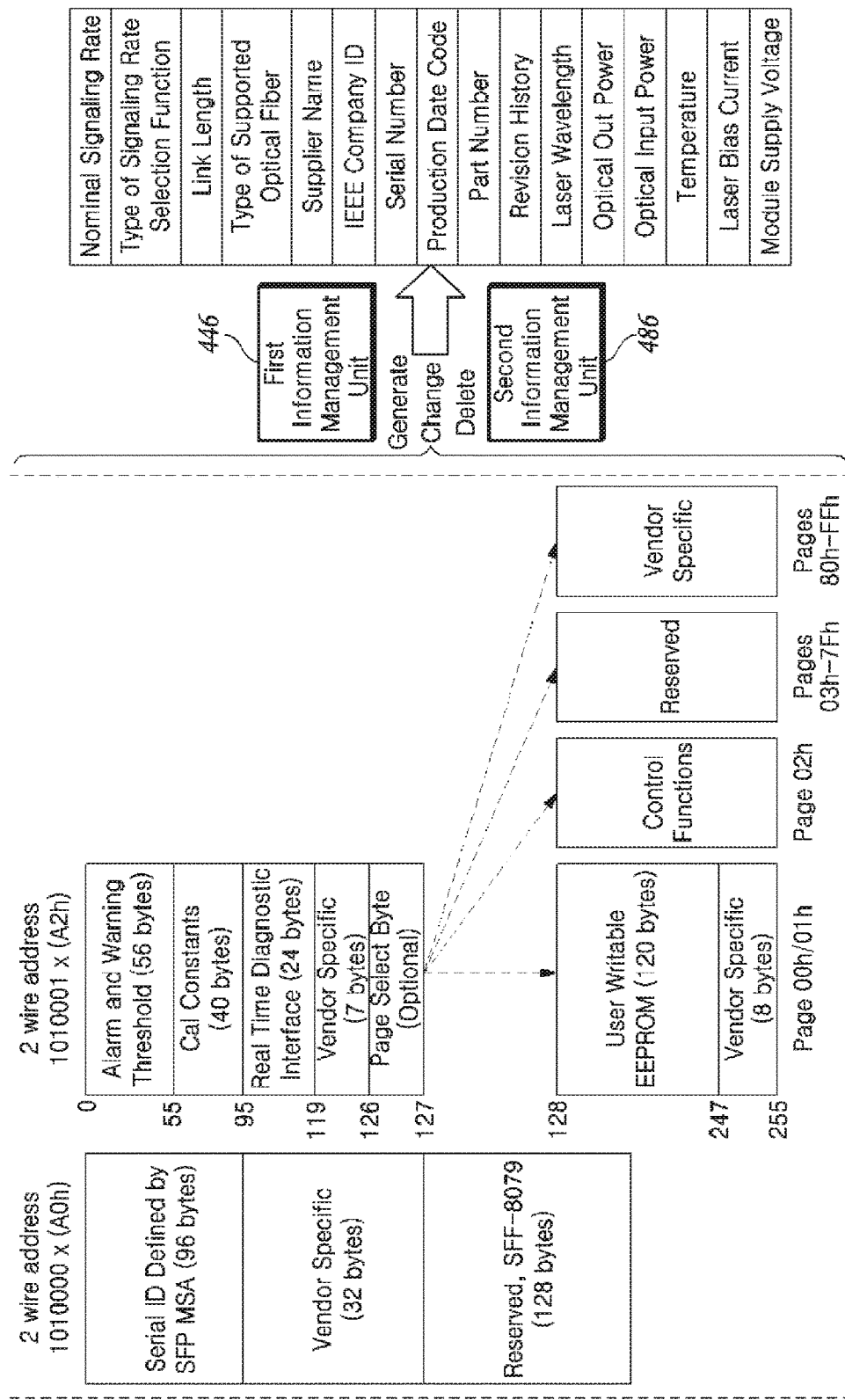
FIG. 5 is a diagram of information stored in internal storages in the AOC according to at least one embodiment of the present disclosure.

FIG. 5 is a diagram of information stored in internal storages in the AOC according to at least one embodiment of the present disclosure.

As shown in FIG. 5, the first information management unit 446 in the first transmission-reception module 310 has its internal storage which stores not only serial IDs, vendor specific information, etc. but also module parameter information for allowing the AOC to be recognized as a direct attach cable (DAC).

The module parameter information includes at least one selected from a nominal signaling rate, type of signaling rate selection function, link length, type of supported optical fiber, supplier name, IEEE company ID, serial number of the product from the supplier, the supplier's production date code, the supplier's provided part number, the supplier's provided revision history of the part number, laser wavelength, optical output power, optical input power, temperature, laser bias current and module supply voltage.

The second information management unit 486 in the second transmission-reception module 320 has its internal storage which stores not only serial IDs, vendor specific information, etc. but also module parameter information for allowing the AOC to be recognized as a direct attach cable (DAC).

When the low power consumption AOC 200 is connected to data centers (first host and second host), the low power consumption AOC 200 transmits the module parameter information to the data centers (first host and second host) with the highest priority from the time of its connection with the data centers (first host and second host) until it performs the process of recognizing the low power consumption AOC 200.

Upon receiving the module parameter information from the low power consumption AOC 200, the data centers (first host and second host) recognizes the AOC as a direct attach cable (DAC) and subsequently performs the same recognition process as with the DAC to recognize the low power consumption AOC 200.

Figure 6:
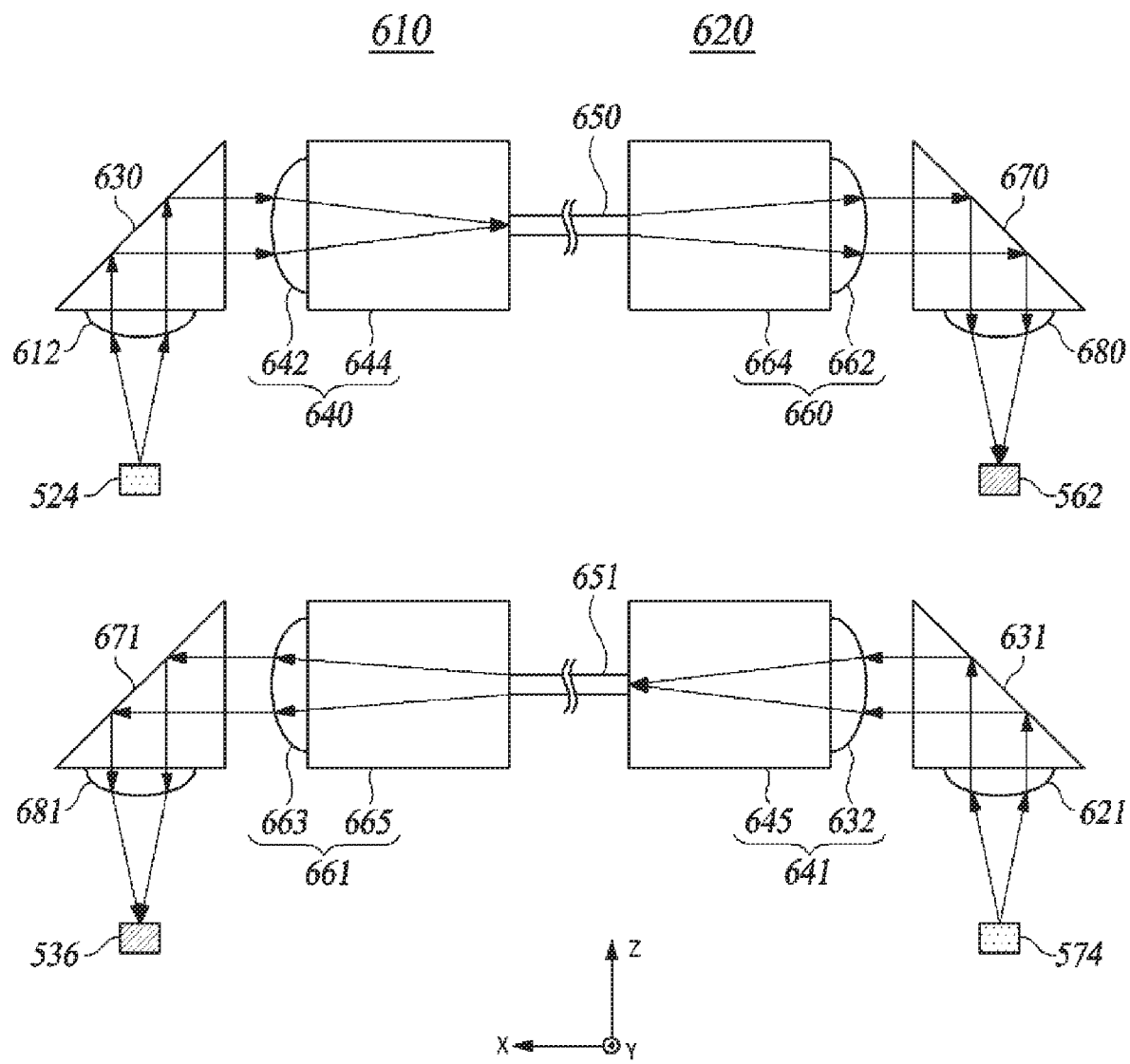
FIG. 6 is a diagram for illustrating a concept of an optical system included in an optical transmission-reception module according to at least one embodiment of the present disclosure.

FIG. 6 is a diagram for illustrating a concept of an optical system included in an optical transceiver assembly according to at least one embodiment of the present disclosure.

The above-described features are applicable not only to the AOC but also to separate optical transceivers or various types of optical transceiver modules.

In some embodiments, the first transmission-reception module 310 is formed to include a first optical assembly 610 which is depicted on the left half side in FIG. 6.

The first optical assembly 610 is an assembly for optical transmission/reception, and includes a first electrical-optical conversion device 524 for transmitting optical signals, a first collimator lens 612, a first reflector 630 and a first transmitter focusing lens unit 640. Herein, the first transmitter focusing lens unit 640 includes a first focusing lens 642 and a first spacer 644.

The first collimator lens 612 shapes diverging light emitted from at least one first electrical-optical conversion device 524 to form a first parallel beam. The first collimator lens 612 transfers the first parallel beam to the first reflector 630. Herein, a set of light rays is called the 'beam'.

The first reflector 630 alters the direction of the first parallel beam by a preset angle to form a second parallel beam. The first reflector 630 reflects and sends the second parallel beam to the first focusing lens 642 wherein the second parallel beam is formed by altering a path of the parallel beam from the first collimator lens 612 by an angle of 90°.

The first focusing lens 642 focuses the second parallel beam and causes a focused second parallel beam to be incident on a first end positioned at a preset distance.

An x-directional thickness of the first spacer 644 corresponds to a distance as much as a focal length of the first focusing lens 642. Light rays passing through the first condensing lens 642 may be focused in a core of the optical fiber 650 by forming the first spacer 644 to have the x-directional thickness identical to the focal length of the first focusing lens 642.

When the first optical assembly 610 according to at least one embodiment is applied to an optical receiver, the roles of the collimator lens and the focusing lens are reversed in terms of function to those of lenses employed in an optical transmitter. Hereinafter, a component including different individual functional elements will be defined as an assembly.

The first optical assembly 610, which is the optical transmission/reception assembly, includes a first optical-electrical conversion device 536 for receiving the optical signals, a fourth focusing lens 681, a fourth reflector 671 and a first receiver focusing lens unit 661. Here, the first receiver focusing lens unit 661 includes a fourth collimator lens 663 and a fourth spacer 665.

At least one first electrical-optical conversion device 524 and at least one first optical-electrical conversion device 536 are optically coupled with at least one optical link 430 through the first optical assembly 610. The first optical signal is diverging light emitted from the at least one first electrical-optical conversion device 524.

A second optical assembly 620 which is depicted on the right half side in FIG. 6 may implement the second transmission-reception module 320 according to at least one embodiment.

The second optical assembly 620, which is an assembly for optical transmission/reception, includes a second electrical-optical conversion device 574 for transmitting optical signals, a third collimator lens 621, a third reflector 631 and a second transmitter focusing lens unit 641. Here, the second transmitter focusing lens unit 641 includes a third focusing lens 632 and a third spacer 645.

The third collimator lens 621 shapes diverging light emitted from the at least one second electrical-optical conversion device 574 to form a third parallel beam. The third collimator lens 621 transfers the third parallel beam to the third reflector 631. Herein, a set of light rays is called the 'beam'.

The third reflector 631 alters the travel direction of the third parallel beam by a preset angle to form a fourth parallel beam. The third reflector 631 sends a fourth parallel beam to the third focusing lens 632 wherein the fourth parallel beam is formed by altering a path of the parallel beam from the third collimator lens 621 by an angle of 90°.

The third focusing lens 632 focuses the fourth parallel beam and causes the focused fourth parallel beam to be incident on a second end positioned at a preset distance. The third optical signal is diverging light emitted from the at least one second electrical-optical conversion device 574.

An x-directional thickness of the third spacer 645 corresponds to a distance as much as a focal length of the first focusing lens 642. Light rays passing through the third focusing lens 632 may be gathered in a core of the optical fiber 651 by forming the third spacer 645 to have the x-directional thickness identical to the focal length of the third focusing lens 632.

When the second optical assembly 620 according to at least one embodiment is applied to an optical receiver, the roles of the collimator lens and the focusing lens are reversed in terms of function to those of lenses employed in an optical transmitter. Hereinafter, a component including different functional elements will be defined as an assembly.

The second optical assembly 620, which is an assembly for optical transmission/reception, includes a second optical-electrical conversion device 562 for receiving optical signals, a second focusing lens 680, a second reflector 670 and a second receiver focusing lens unit 660. Herein, the second receiver focusing lens unit 660 includes a second collimator lens 662 and a second spacer 864.

At least one second electrical-optical conversion device 574 and at least one second optical-electrical conversion device 562 are optically coupled with at least one optical link 430 through the second optical assembly 620.

Although exemplary embodiments of the present disclosure have been described for illustrative purposes, those skilled in the art will appreciate that various modifications, additions and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An active optical cable, comprising:
   a first connector housing at a first end of the active optical cable configured to couple to a first host unit, a second connector housing at a second end of the active optical cable configured to couple to a second host unit, and an optical link extending between the first connector housing and the second connector housing, the active optical cable configured to transfer optical signals inputted from the second end and the first end to the first end and the second end bilaterally;

a first transmission-reception module within the first connector housing, the first transmission-reception module configured
- to either convert a first electrical signal inputted from the first host to a first optical signal and then transmit the first optical signal over the optical link to an opposite end, or convert a second optical signal received from the opposite end of the optical link to a second electrical signal and then output the second electrical signal to the first host unit, and
- to control the first optical signal by using a first information which is at least one or more pieces of pre-stored information on electrical/optical characteristics, temperature characteristics and attribute information; and a second transmission-reception module within the second connector housing, the second transmission-reception module configured
- to either convert a third electrical signal inputted from the second host to a third optical signal and then transmit the third optical signal through the second end to the first transmission-reception module, or convert a fourth optical signal received from the first transmission-reception module through the second end to a fourth electrical signal and then output the fourth electrical signal to the second host unit, and
- to control the third optical signal by using a second information which is at least one or more pieces of pre-stored information on electrical/optical characteristics, temperature characteristics and attribute information;
- wherein the first information is configured to be updated to a third information based on a type of the first transmission-reception module;
- wherein the second information is configured to be updated to a fourth information based on a type of the second transmission-reception module; and
- wherein the third information and the fourth information is configured to be updated based on a module parameter information comprising a length of the optical link.

2. The active optical cable of claim 1, wherein
the first transmission-reception module comprises:
- a first electrical pad unit configured to transmit and receive electrical signals to and from the first host unit,
- a first transmission unit having at least one first electrical-optical conversion device configured to convert the first electrical signal to the first optical signal and a first transmission circuit configured to drive the at least one first electrical-optical conversion device, and
- a first reception unit having at least one first optical-electrical conversion device configured to convert the second optical signal to the second electrical signal and a first reception circuit configured to drive the at least one first optical-electrical conversion device; and wherein the second transmission-reception module comprises:
- a second electrical pad unit configured to transmit and receive electrical signals to and from the second host unit,
- a second transmission unit having at least one second electrical-optical conversion device configured to convert the third electrical signal to the third optical signal and a second transmission circuit configured to drive the at least one second electrical-optical conversion device, and
- a second reception unit having at least one second optical-electrical conversion device configured to convert the fourth optical signal to the fourth electrical signal and a second reception circuit configured to drive the at least one second optical-electrical conversion device.

3. The active optical cable of claim 2, wherein
the first transmission-reception module further comprises:
- a first control unit configured to control the first transmission unit and the first reception unit operatively, and
- a first non-volatile memory configured to store the first information; and wherein the second transmission-reception module further comprises:
- a second control unit configured to control the second transmission unit and the second reception unit operatively, and
- a second non-volatile memory configured to store the second information.

4. The active optical cable of claim 3, wherein the first transmission-reception unit is configured to perform an initialization operation with the first host unit for a predetermined time before transmitting the first optical signal to the second transmission-reception module, and
wherein the second transmission-reception unit is configured to perform an initialization operation with the second host unit for a predetermined time before transmitting the third optical signal to the first transmission-reception module.

5. The active optical cable of claim 4, wherein
the first control unit is configured to control the first transmission circuit so that an intensity of the optical signal can be kept constant once generated by the at least one first electrical-optical conversion device, even with changing internal and external temperatures of the first transmission-reception module, and
the second control unit is configured to control the second transmission circuit so that an intensity of the optical signal can be kept constant once generated by the at least one second electrical-optical conversion device, even with changing internal and external temperatures of the second transmission-reception module.

6. The active optical cable of claim 3, wherein the first non-volatile memory and the second non-volatile memory comprise an electrically erasable programmable read-only memory (EEPROM).

7. The active optical cable of claim 1, wherein the at least one of the first optical signal, the second optical signal, the third optical signal and the fourth optical signal is an optical signal generated on the basis of a pulse amplitude modulation technique which uses at least 2 bit logic information value per unit clock pulse.

8. The active optical cable of claim 7, wherein the pulse amplitude modulation technique comprises PAM-4, PAM-8 and PAM-16.

9. The active optical cable of claim 8, wherein the first transmission-reception module and the second transmission-reception module comprise at least one retimer and at least one equalizer.

10. The active optical cable of claim 1, wherein the optical link comprises at least one optical fiber having one end connected to the first transmission unit and the other end connected to the second reception unit.

11. The active optical cable of claim 10, wherein the at least one first electrical-optical conversion device and the at least one first optical-electrical conversion device are optically connected with the optical link through a first optical assembly, and
wherein the at least one second electrical-optical conversion device and the at least one second optical-electrical conversion device are optically coupled with the optical link through a second optical assembly.

12. The active optical cable of claim 11, wherein the first optical assembly comprises, in an integrated structure:
a first lens configured to shape diverging light emitted from the first electrical-optical conversion device to form a first parallel beam,
a first mirror configured to alter a travel direction of the first parallel beam by a preset angle to form a second parallel beam, and
a second lens configured to focus the second parallel beam and cause a focused second parallel beam to be incident on the first end positioned at a preset distance; and
wherein the second optical assembly comprises, in an integrated structure:
a third lens configured to shape diverging light emitted from the second electrical-optical conversion device to form a third parallel beam,
a second mirror configured to alter a travel direction of the third parallel beam by a preset angle to form a fourth parallel beam, and
a fourth lens configured to focus the fourth parallel beam and cause a focused fourth parallel beam to be incident on the second end positioned at a preset distance.

13. The active optical cable of claim 5, wherein the first control unit is formed integrated with the first information management unit, and wherein the second control unit is formed integrated with the second information management unit.

14. The active optical cable of claim 13, wherein the first information management unit is formed integrated with the first non-volatile memory, and
the second information management unit is formed integrated with the second non-volatile memory.

15. The active optical cable of claim 1, wherein the first module and the second module are further configured to transmit module parameter information that allows the first host unit and the second host unit to recognize the active optical cable as a Direct Attach Cable (DAC), when the first module and the second module are connected to the first host unit and the second host unit.

* * * * *